United States Patent
Find

(10) Patent No.: US 8,801,836 B2
(45) Date of Patent: Aug. 12, 2014

(54) METHOD FOR RECOVERY OF CARBON DIOXIDE FROM A GAS USING A PROCESS GAS HEATED REBOILER FOR CARBON DIOXIDE REMOVAL IN A STRIPPER

(75) Inventor: Rasmus Find, Vejle (DK)

(73) Assignee: Union Engineering A/S, Fredicia (DK)

( * ) Notice: Subject to any disclaimer, the term of this patent is extended or adjusted under 35 U.S.C. 154(b) by 363 days.

(21) Appl. No.: 13/147,476

(22) PCT Filed: Feb. 1, 2010

(86) PCT No.: PCT/DK2010/050027
§ 371 (c)(1),
(2), (4) Date: Sep. 22, 2011

(87) PCT Pub. No.: WO2010/085965
PCT Pub. Date: Aug. 5, 2010

(65) Prior Publication Data
US 2012/0006197 A1      Jan. 12, 2012

(30) Foreign Application Priority Data
Feb. 2, 2009   (DK) .................................. 2009 00154

(51) Int. Cl.
*B01D 53/14*        (2006.01)

(52) U.S. Cl.
USPC ................... 95/183; 95/193; 95/209; 95/229; 95/236; 423/228

(58) Field of Classification Search
None
See application file for complete search history.

(56) References Cited

U.S. PATENT DOCUMENTS 4,160,810 A * 7/1979 Benson et al. ................. 423/220
4,364,915 A * 12/1982 Proctor ....................... 423/437.1
4,514,379 A    4/1985 Miller

FOREIGN PATENT DOCUMENTS

EP              1695756 A1    8/2006
WO    WO 2007012143 A1    2/2007

* cited by examiner

*Primary Examiner* — Duane Smith
*Assistant Examiner* — Pankti Patel
(74) *Attorney, Agent, or Firm* — Browdy and Neimark, PLLC

(57) ABSTRACT

The present invention relates to a method for recovery of carbon dioxide from a gas (G3), in particular the present invention relates to a method for recovery of carbon dioxide using a process gas (G1) heated reboiler (A1) for carbon dioxide removal in a stripper (A3).

9 Claims, 1 Drawing Sheet

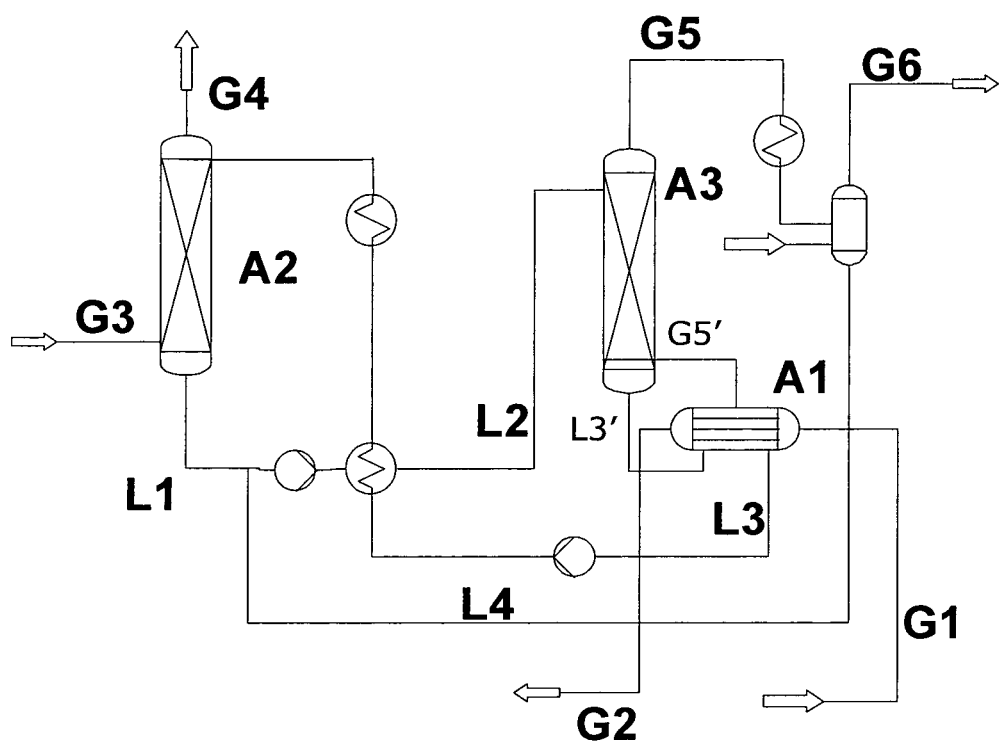

METHOD FOR RECOVERY OF CARBON DIOXIDE FROM A GAS USING A PROCESS GAS HEATED REBOILER FOR CARBON DIOXIDE REMOVAL IN A STRIPPER

The present invention relates to a method for recovery of carbon dioxide from a gas, in particular the present invention relates to a method for recovery of carbon dioxide using a process gas heated reboiler for carbon dioxide removal in a stripper.

BACKGROUND OF THE INVENTION

Carbon dioxide is a well-known gas, which is present in the atmosphere. It is released to the atmosphere in large amounts by fermentation processes, limestone calcination, and all forms of combustion processes of carbon and carbon compounds. In the recent decades, the attention in respect of said emission has been rising, because of the environmental problem due to future climate change via Greenhouse effect. Consequently, extensive work has been performed over the years in order to develop processes for the removal of carbon dioxide from combustion gases. If possible, a subsequent recovery of carbon dioxide may make those processes economical feasible.

Various methods for removal of a gaseous component from a gas stream are known in the art. Especially, absorption followed by stripping with various modifications has been mentioned as suitable methods for removal of components from gaseous waste streams.

It is well known that even marginal optimizations in large-scale carbon dioxide recovery facilities may result in a substantial increase in yield and/or reduction in production costs. There are numerous ways to optimize the process in order to achieve a reduction of energy consumption of the overall process, thus achieving a large economical saving. In large-scale production facilities the thermal energy of combustion gases are often not fully utilized, and is thus wasted. Optimising the utilization of this thermal energy is one way of reducing the overall energy consumption of the facilities.

The object of the present invention is to provide a more economical method for recovery of carbon dioxide from a $CO_2$-containing gas.

DESCRIPTION OF THE INVENTION

A first aspect of the present invention relates to a method for stripping a liquid comprising a carbon dioxide absorbent and carbon dioxide absorbed therein wherein the liquid is heated in a reboiler by means of a flue gas wherein the temperature of the flue gas is 130 to 600° C.

The present inventors have found that the heat comprised in a flue gas is suitable for heating a reboiler connected to a stripper column in a carbon dioxide recovery plant, and that there will be sufficient heat transfer for the stripping process to occur when the temperature of the flue gas is within the claimed range. Thus, what the present inventors found was that the temperature of the liquid in the stripper is heated to the same degree when using a flue gas in the reboiler at a temperature within the claimed range.

In plant facilities where one or more combustion engines are present to supply power to a given production it may be suitable to have concurrent carbon dioxide recovery plant either because the recovered carbon dioxide is to be used in the production, such as in soft drink production, or the recovered carbon dioxide can be sold and thus be a source of income.

Thus, in a presently preferred embodiment of the present invention at least a portion of the flue gas originating from the one or more combustion engines after reboiling the liquid is utilized in the carbon dioxide recovery plant in which the stripper is an operating unit.

Recovering carbon dioxide from the flue gas minimizes the amount of waste carbon dioxide released from a combustion-driven plant production. Furthermore, the recovered carbon dioxide is available in downstream process steps making the recovery economically feasible. Additionally, the recovered carbon dioxide can be liquefied and sold as an end-product or utilized in the production of a given plant.

A second aspect of the present invention relates to a method for recovery of carbon dioxide from a flue gas said method comprising the steps of:

a. cooling a gas stream G1 in a reboiler (A1) to provide a gas stream G2;
b. preparing the gas stream G2 to provide at least a portion of the gas stream G3;
c. absorbing the gas stream G3 in an absorbing agent to provide a carbon dioxide rich liquid L1 and a carbon dioxide lean gas G4;
d. optionally pressurising and heat exchanging the liquid L1 to provide a carbon dioxide rich liquid L2;
e. separating the carbon dioxide rich liquid L2 in a stripper (A3) in order to obtain a carbon dioxide rich gas G5 and a carbon dioxide lean liquid L3';
f. reboiling the carbon dioxide lean liquid L3' in the reboiler (A1) in order to obtain a gas G5' which is further separated in the stripper (A3) in order to give the carbon dioxide lean liquid L3 and the carbon dioxide rich gas G5.

In the method the flue gas to be purified is prior to being fed to the carbon dioxide recovery plant used as the warm gas stream in a reboiler for re-heating the liquid stream to be stripped for carbon dioxide. This process step of reheating the liquid in connection to the stripper is similar to the process of claim 1. In the present invention the thermal energy of the flue gas is thus further utilized in the carbon dioxide recovery process as compared to the prior art.

In principle, any kind of gas comprising carbon dioxide, oxygen, and nitrogen compounds may be applied in the process. In a preferred embodiment, however, the feeding gas is flue gas.

By reheating the carbon dioxide lean absorbent by means of the reboiler using the feeding flue gas it is both possible to recover carbon dioxide and at the same time utilize some of the heat comprised in the flue gas, which would otherwise be wasted.

The dimensions of the reboiler are designed such that the surface temperature on the liquid side of the reboiler does not exceed a critical temperature. The dimensions will depend on the flow of the flue gas and the temperature of the flue gas.

The critical temperature is in this context defined by the temperature at which the absorbent starts to thermally degrade. For example, in an embodiment of the present invention the absorbent may be monoethanolamine (MEA) having critical temperature in this context of about 130° C.-140° C. Accordingly, the reboiler in that embodiment of the present invention is designed such that the surface temperature of the liquid side does not at any point exceed 130° C., again the dimensions being dependent on the flow and the temperature of the flue gas. However, if the temperature is too high, the piping for the flue gas would have to have a diameter too high to be practical in the physical set up of the reboiler in the plant. Therefore the upper limit of the temperature of the flue gas is found to be a combination of reducing the degree of thermal degradation of the absorbent and having a practical size reboiler.

On the other hand if the temperature on the liquid side does not reach an optimal temperature, insufficient heat exchange occurs and the liquid will not evaporate in a satisfactory degree whereby the desired additional carbon dioxide recovery will not be obtained.

The set up and dimension of an appropriate reboiler is among others dependent on the volume of the flue gas stream and the absorbent used, and is within the skill of the art.

In a presently preferred embodiment of any one of the aspects of the invention the method, e.g. prior to step a. of the second aspect, further comprises the step of feeding a combustion gas G0 to a means for utilising heat such as a steam boiler, in order to provide the gas stream G1, G1 having a temperature that is lower than the temperature of G0.

Prior to being used in the reboiler the majority of the thermal energy of the combustion gas (i.e. the flue gas) is in this embodiment being utilized preferably in another process not directly related to the carbon dioxide recovery process. The flue gas G0 is cooled to obtain the gas G1 by utilizing the heat in said other process. The other process may be but is not limited to a steam boiler, a piston engine, an absorption chiller, thermal oil heater or any other suitable unit that can benefit from the heat exchange.

The present inventors found that a flue gas having a temperature down to approximately 130° C. is sufficient to complete the reboiling of the liquid in the stripper and optionally subsequently feeding the flue gas to a carbon dioxide recovery plant. Thus, the excess heat above 130° C. can be used elsewhere e.g. in an air condition or central heating system for use in adjacent office facilities; or in a steam boiler for use in sterilisation with steam or other suitable heat utilizing systems. Thus, in this embodiment the temperature of the gas entering the reboiler is in the lower range of the claimed temperature range.

In another preferred embodiment the gas G0 is a pool of the exhaust gas from at least two combustion engines such as 2, 3, 4, 5 or more.

When the feeding gas stream G0 is a flue gas originating from at least two combustion engines, the exhaust gas of said combustion engines being interconnected into the same downstream recovery stream. The feeding of the stream of the exhaust gas from at least two combustion engines can be regulated dependent on the demand for flue gas in the recovery process. Said interconnection of the exhaust gases reduces the required number of downstream processing equipment for purification of the exhaust gas, such as a Denox unit for reducing NOx's in the gas, and thereby reducing overall production plant costs.

FIGURES

FIG. 1 is an illustration of an embodiment of the method of the present invention integrated in one carbon dioxide recovery line.

DETAILED DESCRIPTION OF THE INVENTION

According to the present invention, a carbon dioxide rich stream is the stream with the highest content of carbon dioxide exiting the unit and the lean stream is the one with the lowest content of carbon dioxide exiting the unit. Said stream being either gas or liquid. Throughout the description, unless otherwise indicated, all contents are given as weight-%.

Throughout the description and the claims the term flue gas, exhaust gas, feeding gas, and combustion gas may be used interchangeably having the same meaning in the context of the present invention. Said gases being a gas containing at least partly carbon dioxide, such gas further comprising nitrogen oxides, water vapour, sulphur dioxide and volatile organic compounds (VOC).

The illustration appended to the present description should be understood as a section of a larger facility. All features and variants of each the embodiments described herein apply equally to all embodiments.

Referring to FIG. 1, an embodiment of the present invention is illustrated in which carbon dioxide is recovered substantially in two steps. Initially, carbon dioxide is separated from impurities by absorption of carbon dioxide from the cooled feed gas by means of an absorbing agent. After this gas/liquid separation, the carbon dioxide absorbed in the liquid stream is recovered by subjecting said liquid stream to a stripping procedure, by which the carbon dioxide present in the liquid is stripped.

The first step (not shown) of the method according to the present invention utilises heat in a steam boiler by means of feeding combustion gas G0 obtained from e.g. a piston engine in order to provide a gas stream G1.

The temperature of the gas stream G1 is equal to or lower than the temperature of the feeding combustion gas G0. When the temperature of G1 is lower than the temperature of G0 the heat has been utilized for example in a steam engine, absorption chiller or the like. Such utilization of the heat is an economical way exploiting the heat in the exhaust gas in processes that require heat such as pasteurisation, sterilisation, cooling etc. In a preferred embodiment the combustion gas stream is cooled during feeding in such a way that the temperature of G1 is between 130° C. and 450° C., such as between 130° C. and 200° C.

A heat exchange between the gas stream G1 and a liquid absorbing agent, L3', comprising carbon dioxide takes place in a reboiler (A1) to provide a cooled flue gas stream G2 and a reheated gas stream G5' comprising absorbent and carbon dioxide. The cooled gas stream G2 can be further processed, e.g. by additional heat exchange, in order to obtain a gas stream G3. In an alternative embodiment at least a part of the cooled gas stream G2 is discarded as a waste gas.

The gas stream G3 originating from G2, any other suitable source or a combination thereof is fed to an absorption column (A2) wherein the carbon dioxide in the gas stream is absorbed into an absorbent liquid (not shown) to give a carbon dioxide rich liquid L1. Said absorbent liquid containing the major part (that is more than 90%) of the carbon dioxide entering the absorption column and a carbon dioxide lean gas G4 leaving the absorption column.

The absorbing agent used for absorption of gaseous carbon dioxide may be any solvent known to be able to absorb carbon dioxide. The absorbing agent can cause a chemical or a physical absorption. The absorbent can be a solution of an alkanolamine having 1 to 3 alkanol radicals, each alkanol radical having 1 to 3 carbon atoms, and water. Examples of the alkanolamines are monoethanolamine (MEA), diethanolamine (DEA), and triethanolamine (TEA), MEA being the absorbent of choice.

The carbon dioxide liquid stream L1 leaving the absorber (A2) is heated by means of heat exchange to provide a heated carbon dioxide-rich liquid L2. Said carbon dioxide-rich liquid stream is further processed in a stripping column to provide a carbon dioxide rich gas G5 and a carbon dioxide lean liquid L3'.

The carbon dioxide-lean liquid L3' is re-heated in the reboiler (A1) by means of the warm gas stream G1, separating L3' into a liquid absorbent carbon dioxide lean stream L3 and a carbon dioxide rich gas stream G5'. G5' re-enters the stripping column (A3) for increasing the carbon dioxide yield of the over all process.

The remnants of the absorbent in the gaseous stream G5 is condensed by means of a condenser and is thereby separated into a carbon dioxide rich gas stream G6 and a liquid remnant absorbent stream L4. Said liquid remnant absorbent stream L4 is recycled into the carbon dioxide rich liquid stream L1.

The method of the invention can be used in any carbon dioxide recovery method, such as that disclosed in WO2008/086812 in which a carbon dioxide recovery process similar to the one just disclosed comprises the further intermediate step of flashing the carbon dioxide lean liquid from the absorber before stripping.

The invention claimed is:

1. A method for recovery of carbon dioxide from a carbon dioxide containing gas comprising the steps of:
   a. cooling a first gas stream G1 in a reboiler (A1) to provide a second gas stream G2;
   b. preparing the second gas stream G2 to provide at least a portion of a third gas stream G3
   c. absorbing the third gas stream G3 in an alkanolamine absorbing agent to provide a first carbon dioxide rich liquid (L1) and a carbon dioxide lean gas (G4);
   d. optionally pressurising and heat exchanging the first carbon dioxide rich liquid (L1) to provide a second carbon dioxide rich liquid (L2);
   e. separating the second carbon dioxide rich liquid (L2) in a stripper (A3) in order to obtain a carbon dioxide rich gas (G5) and a first carbon dioxide lean liquid (L3');
   f. reboiling the first carbon dioxide lean liquid (L3') in the reboiler (A1) in order to obtain a second carbon dioxide lean liquid (L3) and a gas G5' which is further separated in the stripper (A3), in order to give the second carbon dioxide lean liquid (L3) and the first carbon dioxide rich gas G5; wherein the first carbon dioxide lean liquid (L3') is reboiled using the gas stream G1 and the second carbon dioxide lean liquid (L3) is returned to the absorber (A2); and wherein the method prior to step a comprises the step of feeding a combustion gas GO to a means for utilizing heat, in order to provide the gas stream G1, the gas stream G1 having a temperature that is lower than the temperature of GO.

2. A method according to claim 1, wherein the combustion gas (GO) is a pool of the exhaust gas from at least two combustion engines.

3. A method according to claim 1, wherein the temperature of the first gas stream (G1) is 130° C.-600° C.

4. A method according to claim 1, wherein the temperature of the first gas stream (G1) is 130° C.-200° C.

5. A method according to claim 1, wherein the means for utilizing heat to which the combustion gas (G0) is fed is separate from and is not related to the carbon dioxide recovery.

6. A method according to claim 1, wherein the means for utilizing heat to which the combustion gas (G0) is fed is selected from the group consisting of a steam engine, a piston engine, an absorption chiller, a thermal oil heater, an air conditioning device, and a central heating system.

7. The method of claim 1, wherein the alkanolamine absorbing agent of step c is selected from mono-ethanolamine (MEA), diethanolamine (DEA) and triethanolamine (TEA).

8. A method according to claim 2, wherein the temperature of the first gas stream (G1) is 130° C.-600° C.

9. A method according to claim 2, wherein the temperature of the first gas stream (G1) is 130° C.-200° C.

* * * * *